R. J. RONEY.
Fish, Bait, and Oyster-Can.

No. 204,168.  Patented May 28, 1878.

WITNESSES
C. W. Smith
J. E. Miles

INVENTOR
Robert J. Roney

UNITED STATES PATENT OFFICE.

ROBERT J. RONEY, OF SYRACUSE, NEW YORK.

IMPROVEMENT IN FISH, BAIT, AND OYSTER CAN.

Specification forming part of Letters Patent No. 204,168, dated May 28, 1878; application filed July 10, 1877.

*To all whom it may concern:*

Be it known that I, ROBERT J. RONEY, of Syracuse, in the county of Onondaga and State of New York, have invented a new and Improved Fish, Bait, and Oyster Can, of which—

Figure 1:
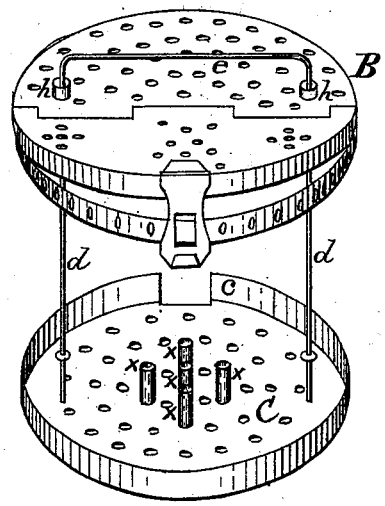
Figure 2:
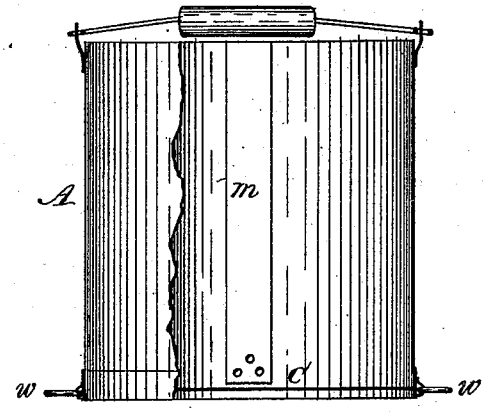

Figure 1 is a perspective view of the cover, false bottom, and the lifting-bail. Fig. 2 is a perspective view of the can alone, with part of one side broken out.

The object of my invention is to furnish an improved can for the transportation and preservation of fish or fry or of live bait for fishing, and also as an oyster-can.

It consists in applying to a can a false bottom, which is perforated, and to which a bail is attached, extending through and above the cover, as hereinafter more fully and specifically described.

It is constructed as follows: I first make a straight-sided can, A, of any desired size, with a solid bottom. The top of this can is covered by a cover, B, fitted into or over the upper part. This cover is divided crosswise into two parts, which are hinged together so as to allow the front part to be raised or lowered to open or close the can. The rear part may be fastened to the upper part of the can, or made to fit closely. The front part, when closed, can be fastened by an ordinary hasp and staple. Upon the rear part, when made to fit the top of the can, is placed a lug, which fits into an eye on the outside of the can. In the upper surface of the cover holes are punched, as shown in the drawings. I then make a flat false bottom, C, with a narrow flange, c, turned up all around it, of such size as to fit closely yet loosely within the can, whether the can be round, square, or oval in shape. This false bottom is also perforated or punched full of holes, as shown in the drawings. Over these holes short tubes X may be placed, if desired, as shown in the drawings. To the upper surface of this false bottom C, I attach two wires, $d\ d$, upon a line intersecting the center, one on each side of the center, and both equidistant therefrom. These wires $d\ d$ extend up through the rear part of the cover, and above it are united, so as to form a bail, $e$; or the whole may be made of one piece of wire, bent to the proper shape. Where these wires pass through the cover, tubular guides $h$ are placed, in order to steady the wires and allow them to work easily.

Upon the inside of the can, or as I prefer, and as shown in the drawings, a stop is placed upon each of the wires a short distance above the false bottom, to prevent its being raised too high, and so as to always leave an air-chamber in the top of the can, for the purposes hereinafter set forth.

Upon the inner surface of the can one or more flat or oval tube or tubes, $m$, can be placed, if desired, extending from the top to the bottom, or nearly so. The object of these will hereinafter appear. When these tubes $m$ are used corresponding slots or notches are cut in the edge of the false bottom, as shown in the drawings.

This invention is operated as follows: It is a well-known fact that fish in confinement soon exhaust the oxygen in the water and die, and especially where a large number are to be kept alive in a comparatively small quantity of water, except by changing the water frequently. By my invention this result can be accomplished without changing the water. Having filled the can part full of water, the fish, fry, or bait are put in above the false bottom. After this all that is necessary to be done is to occasionally work the apparatus by taking hold of the bail $e$, raising it, and by it the false bottom C, to or above the surface of the water, and then pressing down firmly upon the bail until the false bottom is down to the bottom of the can. This firm downward pressure of the false bottom upon the water has the effect of causing the water to be forced up through the holes in the false bottom and rise in jets or sprays. This exposes the water to the action of the atmosphere; the water takes in oxygen, and is revived. Repeating this three or four times will thoroughly revive the water—*i. e.*, charge it with oxygen.

The object of the tubes X is to more thoroughly cause the water to rise in jets and sprays.

The object of the tubes $m$ is that when the false bottom is raised quickly the suction created thereby will draw a current of air down through the tube and into the water in the can, and thereby assist in aerating the water by supplying oxygen.

When used as a bait-can, it possesses the great advantage that by simply raising the false bottom to the surface of the water a person can readily select just the particular bait he desires without wetting more than the tips of his fingers.

As an oyster-can, its principal use will be as a strainer to readily separate the solid meats from the juices for sale by simply raising by the bail the false bottom.

Upon each side of the can, at the bottom, I place rings W W, which serve the purposes of handles in emptying the can, of allowing the can to be readily fastened firmly to a wagon or car in transportation, or to the bottom of a boat in fishing, in order to prevent its being tipped over or jostled about, and also to hang up the can bottom side up when empty, allowing it to drain out and dry more readily.

Having thus described my invention, what I claim as my invention, and desire to secure by Letters Patent, is—

1. In a fish, bait, and oyster can, the combination of the perforated false bottom C, provided with the flange c and lifting-bail e, having wires d d attached thereto, with the perforated cover B, having guides h, substantially as set forth.

2. The above-described fish, bait, and oyster can, consisting of the perforated false bottom C, having tubes X, bail e, wires d d, and the sectional hinged cover B, having guides h, in combination with the can A, having tubes m, substantially as and for the purpose set forth.

ROBERT JOHN RONEY.

In presence of—
 C. W. SMITH,
 J. E. MILES.